United States Patent [19]

Ueshima

[11] 4,093,751
[45] June 6, 1978

[54] PROCESS FOR TREATING MILK-COFFEE MIXTURES IN SEALED CONTAINERS TO ELIMINATE INCONSISTENCY AND DETERIORATION IN TASTE

[76] Inventor: Tadao Ueshima, 16-go, 2-ban, Takamaru, 1-chome, Tarumi-ku, Kobe-shi, Japan

[21] Appl. No.: 620,785

[22] Filed: Oct. 8, 1975

[30] Foreign Application Priority Data

Oct. 9, 1974 Japan .................. 49-116458

[51] Int. Cl.$^2$ ........................... A23F 1/12; B05B 3/00
[52] U.S. Cl. .................................. 426/407; 426/594
[58] Field of Search ............... 426/399, 401, 400, 407, 426/408, 409, 412, 403, 594; 21/78, 80

[56] References Cited

U.S. PATENT DOCUMENTS

| 686,259 | 11/1901 | Cameron | 426/408 X |
|---|---|---|---|
| 1,195,091 | 8/1916 | Robinson | 426/409 |
| 1,436,947 | 11/1922 | Daus | 426/409 |
| 1,923,421 | 8/1933 | Chapman | 426/408 |
| 2,170,196 | 8/1939 | Grindrod | 426/401 X |
| 2,401,131 | 5/1946 | Beasel | 21/80 X |
| 2,493,586 | 1/1950 | Lang | 426/407 |
| 2,569,645 | 10/1951 | Viall | 426/408 X |
| 2,620,276 | 12/1952 | Meyman | 426/407 |
| 3,015,659 | 10/1971 | Webel | 426/407 |

FOREIGN PATENT DOCUMENTS

| 12,731 of | 1898 | United Kingdom | 426/409 |
|---|---|---|---|
| 1,143,405 | 2/1969 | United Kingdom | 426/407 |

*Primary Examiner* — Robert Halper
*Attorney, Agent, or Firm* — Birch, Stewart, Kolasch and Birch

[57] ABSTRACT

A process for obtaining food and/or drink for instance coffee with milk etc. hygenically sealed in containers. Upon filling and sealing the hot food and/or drink in continuous operation, each of the containers is immediately subjected to forced cooling for cooling rapidly substantially in a predetermined time nearly to normal room temperature. The containers may then be left at room temperature for some time, somewhat longer or shorter one compared with another, and upon accumulation of suitable number of them, they are heat-treated in batch manner in a pressure tank for pasteurization or sterilization.

1 Claim, 3 Drawing Figures

PROCESS FOR TREATING MILK-COFFEE MIXTURES IN SEALED CONTAINERS TO ELIMINATE INCONSISTENCY AND DETERIORATION IN TASTE

BACKGROUND OF THE INVENTION

1. Field of the Invention

This invention relates to a process for obtaining foodstuffs and/or beverages of various kinds, for instance coffee with milk, hygenically sealed in containers of various kinds, for instance cans.

2. Description of the Prior Art

Generally in filling food and/or drink in containers such as cans, for example, it is conventionally quite common to fill the food and/or drink in the container in the hot state, sometimes by reason of the preceding and/or subsequent processing steps and sometimes with the aim of attaining the pasteurizing effect, though of preliminary nature. It is conventional to perform the filling in continuous operation and, upon accumulation of a suitable number of the filled and sealed containers, to charge the containers into a pressure tank of considerably large volume for pasteurization or sterilization under heat in a batch manner. Therefore, the containers filled with the hot food and/or drink in a continuous operation must wait for some irregular length of time, until accumulation of the suitable number of them, before undergoing the pasteurization or sterilization treatment. Conventionally, the containers are left for said time intervals in ambient air without any particular processing, thus undergoing natural cooling. Duration of such natural cooling time is, as has already been referred to as "irregular time", differs from one container to another, according to whether they have been filled and sealed earlier or later, since the filling and sealing of the containers are in the continuous operation and the pasteurization or sterilization is in the batch operation. When charged into the pressure tank, the temperature is therefore different from one container to another. Starting from such different initial conditions, the containers undergo diverse heating or temperature increases in the pressure tank. Duration of the heat treatment time after heated to the effective pasteurizing temperature is thus diverse from one container to another. The taste of some food or drink is quite sensitive to the cooling condition and to the temperature and duration of the pasteurization or sterilization treatment, and thus the irregularities of the heat-treatment condition as mentioned above have resulted in the disadvantage of failure to guarantee a constancy in taste of the sealed food and/or drink from one container to another. This disadvantage is quite detrimental, particularly when the sealed drink is coffee, one of the most important features of which is the aroma.

As a remedy for the above disadvantages, it might be considered to work out an overall continuous operation system where the containers are first continuously filled and sealed and then without interrupting stacking or storing they are serially subjected to the subsequent pasteurizing or sterilizing process as the latter part of a continuous operation. However, such a system is, in fact, hardly feasible in view of the technical difficulties and large installation costs, as may be understood from the explanation given hereunder.

Pasteurizing or sterilizing tanks can not be used to heat the containers under normal atmospheric pressure since the inner pressure of the heated containers may be high enough to deform or burst the containers if treated in such open air condition. By way of practical example, coffee cans made of aluminum with an easy open end as commonly used these days may sometimes deform and burst out when heated to 120° C in open air condition, even though the inner pressure was subatmospheric at normal room temperature, say somewhat below 300 mm Hg at 20° C. Therefore, in order to safely raise the temperature of these cans for pasteurization or sterilization, it is required to keep the inner space of the treating tank under raised pressure conditions in response to the increase in the temperature of the cans. However, it is technically difficult and will result in big installation costs to maintain the tank chamber at high pressure while admitting smoothly continuous charging of the filled and sealed containers into the chamber.

SUMMARY OF THE INVENTION

The present invention is to provide a process for sealing up foodstuffs and/or beverages into containers, in which the pasteurization or sterilization is not continuous because of the use of the conventional batch-type pressure tank, but which can yet assure proper consistent taste, without deterioration, of the foodstuffs and/or beverages sealed under heat treatment, such as coffee, juice, fruit etc.

According to the present invention, the process for sealing up foodstuffs and/or beverages into containers wherein hot foodstuffs and/or beverages are continuously filled into the containers which are then continuously sealed and permitted to stand, until the accumulation of a suitable number of them for subsequent pasteurization or sterilization in a batch-type pressure tank, is characterized by the improvement comprising the steps of cooling rapidly, substantially in a predetermined time, the continuously sealed containers under forced cooling, to almost normal room temperature leaving the cooled containers at normal room temperature until accumulation of the suitable number of them, and pasteurizing or sterilizing the accumulated containers in the batch-type pressure tank.

Since the containers are, upon continuous filling with the hot food and/or drink and sealing, subjected first to forced cooling for cooling substantially in a predetermined time nearly to normal room temperature and then left in room air, the effective cooling time of the sealed food and/or drink is substantially constant throughout all the containers without regard to the order in which each container in the continuous filling and sealing operation is filled, and in spite of the fact that the containers are then left in room air until accumulation of a proper number of them suitable for utilizing the full capacity of the batch-type pasteurizing or sterilizing pressure tank. As all the containers are thus cooled down nearly to normal room temperature when they are charged into the pressure tank upon accumulation of the suitable number of them, all the containers undergo substantially uniform temperature rise during the heat-treatment in the tank and thus also uniform duration of the heat treatment time at the effective pasteurizing temperature. Inconsistency and deterioration of taste of the sealed food and/or drink in each of the containers can thus be eliminated, in spite of the batch-type pressure tank which is used for the pasteurization or sterilization step.

The main object of the present invention is thus to eliminate inconsistency and deterioration of taste of the food and/or drink filled and sealed in the containers under heat-treatment in a continuous operation.

Another object of the present invention is to have all the containers, charged in the pressure tank, undergo the heat-treatment under uniform condition, by having all of them cooled down nearly to normal room temperature when they are charged into the tank upon the accumulation of a suitable number, thus eliminating inconsistency of taste of the food and/or drink in the containers in spite of the use of the conventional batch-type pressure tank.

Yet another object of the present invention is to maintain excellent and uniform taste of coffee with milk by subjecting the containers, after they have been filled and sealed, to forced cooling to cool them substantially down to 40° C substantially in 5 minutes, in spite of the fact that the taste of coffee with milk tends to deteriorate and lack uniformity when the containers filled therewith are heat-treated after being left to natural cooling.

For a better understanding of the present invention and still further objects and advantages, reference will be made to the following description and accompanying drawings and to the appended claims in which the new and novel features of this invention are set forth.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
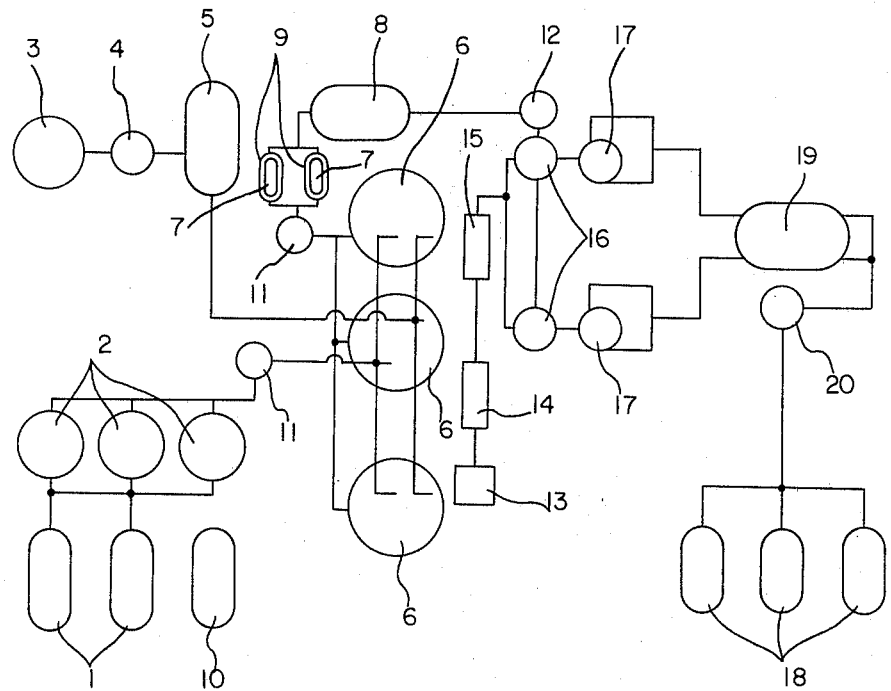
FIG. 1 is a flowsheet showing the steps for sealing up coffee with milk in the containers according to the present invention.
Figure 2:
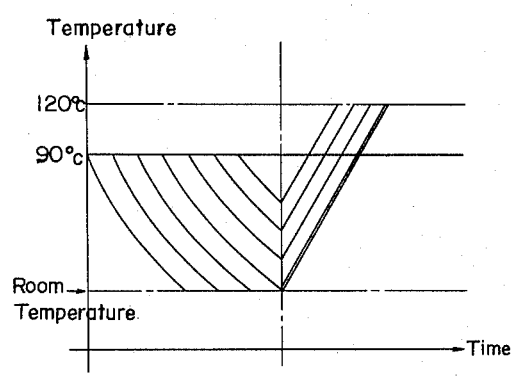
FIG. 2 is a chart showing the temperature changes of each of the containers after filling with food and/or drink and sealing, according to the prior art thus subjecting the container to natural cooling.
Figure 3:
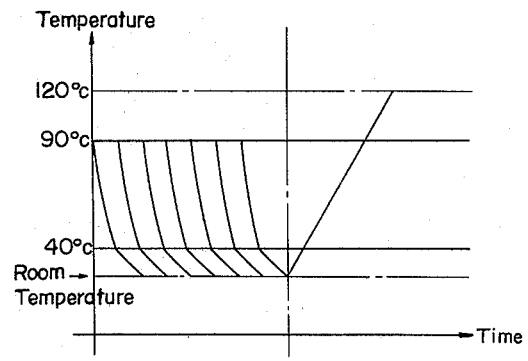
FIG. 3 is a chart showing the temperature changes of each of the containers after filling with food and/or drink and sealing, according to the present invention thus subjecting the containers to forced cooling.

The present invention will be described with reference to FIG. 1 which shows in a non-limitative manner a flowsheet for production of coffee with milk sealed in cans (hereinafter referred to as milk-coffee).

Designated at 1 are pressure-type filters or percolators for extracting the essence from a mixture of coffee beans and hot water, and the percolated liquid is stored in liquid tanks 2. On the other hand, designated at 3 is a dissolver tank for powdered milk, connected via a filter or strainer 4 and then a homogenizer 5 to mixing or preparation tanks 6. Designated at 7 are a pair of filters or strainers connected to a plate-type heater 8. The strainers 7 themselves are also each equipped with respective plate-type heaters 9 for preheating purpose. All the connections as illustrated are properly made by any suitable means such as pipes or tubings. Water heater 10 is provided for supplying hot water to percolators 1, dissolver tank 3 etc. As also shown, there are provided pumps 11 and a balancing tank 12. Further, there is a line consisting of a supplier or feeder 13 of empty cans, a washer 14 for cleaning the empty cans, and labeler 15. Designated at 16 are dispensers or fillers for filling the empty cans with the milk-coffee, and at 17 are seamers for sealing up the filled cans. Constituents of this can line, 13 - 17, are connected with suitable transfer means, for instance belt conveyors. Designated at 18 are pasteurizing or sterilizing tanks which can accommodate the sealed cans upon accumulation of a suitable number of them and which may function preferably to pasteurize or sterilize the cans at 115°-120° C under pressure for about 30 minutes and then to forcably cool them down. Thus the cans which have been sealed up by the seamers 17 are to be charged into the pressure tanks 18 for pasteurization or sterilization in large numbers each as mentioned above. Preliminary thereto, however, there is installed, as an essential feature of the present invention, a multi-stage forced cooler 19 near the seamers 17, with suitable transfer means connecting the seamers 17 and the cooler 19. Preferably, this cooler 19 is of the type that the water shower is blown directly on to the cans to substantially cool down the can to 40° C in approximately 5 minutes. This shower type is preferable since the shower serves for the dual purpose of cooling down and also cleaning the cans, as well. Designated at 20 is a can supporter means for transferring the cans to the pressure tanks 18 after cooling down by the cooler 19.

How this system operates and how the production process proceeds is now described. Coffee beans are fed to the percolator 1 together with hot water from the water heater 10, and the liquid with coffee essence extracted by the percolator 1 is stored in liquid tanks 2. The liquid in these tanks 2 is successively supplied to the preparation tanks 6 by means of the pumps 11. On the other hand, milk in the dissolver tank 3 is treated in the homogenizer 5 and is also supplied to the preparation tanks 6. Though not illustrated, sugar is also dissolved and is supplied to the preparation tanks 6. The milk-coffee thus properly prepared is forwarded to either one of the pair of strainers 7 for filtration and at the same time for preheating by means of the plate-type heater 9. Then after main heating by the plate-type heater 8, the liquid is supplied to the fillers 16 via the balancing tank 12 at a temperature in the range of 90°-95° C.

These fillers 16 will thus fill the milk-coffee into the empty cans supplied from the can feeder 13, washer 14 and labeler 15. As mentioned above, the milk-coffee is here very hot in the range of 90°-95° C, and this will function for killing, to some extent, bacteria that may be present in the empty cans. The filled cans are sealed up in a hot state by the seamers 17.

Cans thus successively sealed up and delivered from the sealer are then immediately and continuously fed to the cooler 19 and rapidly forced cooled down to approximately 40° C, in about 5 minutes. The cans are then permitted to further cool down naturally. It has been found that the taste will in no practical way be affected by such latter stage of natural cooling down to the ultimate room temperature, only if the cans have first been subjected to the rapid forced cooling down to about 40° C.

When a suitable number of the successively delivered, rapidly cooled cans have accumulated, they are charged as a group into the pressure tanks 18. Under pressure maintained in the pressure tanks 18, the charged cans are pasteurized or sterilized at 115°-120° C for approximately for 30 minutes, whereafter they are rapidly cooled down within the same tanks to near normal room temperature and are then taken out.

Besides milk-coffee, any kind of food or drink which can be filled under heat treatment, such as for instance ordinary coffee, juice, a mixture of fruit and syrup etc., may also advantageously, be treated according to the present invention. Containers other than cans, such as, for example, as bottles, plastic or paper bags etc., can also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. An improved process for treating milk-coffee mixtures in sealed containers to eliminate inconsistency and deterioration in taste, wherein a hot milk-coffee which has been previously heated to a temperature of 90° to 95° C is continuously introduced into containers which are then continuously sealed, and wherein the sealed containers are permitted to accumulate in number for subsequent pasteurization or sterilization as a group, in a batch-type pressure tank, wherein the improvement comprises:

rapidly force cooling the sealed accumulated containers containing the hot milk-coffee mixture from 90° to 95° C to about 40° C in about 5 minutes, allowing the cooled containers to further cool naturally in ambient air to about room temperature and pasteurizing or sterilizing the accumulated containers in the batch-type pressure tank.

* * * * *